United States Patent [19]
Barber et al.

[11] 3,920,877

[45] Nov. 18, 1975

[54] FULLY CURED CROSSLINKABLE PRESSURE SENSITIVE ADHESIVE MATERIALS AND METHOD OF MAKING SAME

[75] Inventors: Robert C. Barber, Baltimore; Robert J. Bettacchi, Columbia; C. Bent Lundsager, Ashton; Louis L. Wood, Rockville, all of Md.

[73] Assignee: W. R. Grace & Co., New York, N.Y.

[22] Filed: Mar. 23, 1973

[21] Appl. No.: 344,305

Related U.S. Application Data

[63] Continuation-in-part of Ser. No. 159,000, July 1, 1971, abandoned, which is a continuation-in-part of Ser. No. 142,346, May 11, 1971, abandoned, which is a continuation-in-part of Ser. No. 59,003, July 28, 1970, abandoned.

[52] U.S. Cl. ............. 428/345; 260/79.5; 427/12; 427/54
[51] Int. Cl. ........................ B44d 1/50; C08f 3/00
[58] Field of Search ....... 110/93.31, 122 P, 122 PA, 110/122 PF, 161 UZ; 260/79, 79.5 R

[56] References Cited
UNITED STATES PATENTS

| | | | |
|---|---|---|---|
| 3,240,844 | 3/1966 | Gruver | 260/894 |
| 3,264,536 | 8/1966 | Robinson et al. | 260/876 |
| 3,301,796 | 1/1967 | Herold | 117/161 ZB |
| 3,338,810 | 8/1967 | Warner | 117/93.31 |
| 3,347,362 | 10/1967 | Rabuse et al. | 117/122 PF |
| 3,403,187 | 9/1968 | Oswald et al. | 117/93.31 |
| 3,506,626 | 4/1970 | Warner et al. | 117/93.31 |
| 3,578,614 | 5/1971 | Wszolek | 117/93.31 |
| 3,661,744 | 5/1972 | Kehr et al. | 117/93.31 |
| 3,662,022 | 5/1972 | Lard | 117/93.31 |

OTHER PUBLICATIONS

Encyclopedia of Poly. Sci. and Tech. Vol. 4 p. 336 John Wiley & Sons, Inc. New York 1966.

*Primary Examiner*—William D. Martin
*Assistant Examiner*—John H. Newsome
*Attorney, Agent, or Firm*—Richard P. Plunkett; Kenneth E. Prince

[57] ABSTRACT

Semi-solid pressure sensitive polythioether polymer systems are formed by quickly curing liquid components by UV or $\beta$ irradiation. These polymer systems are tacky when fully cured and are useful as pressure sensitive adhesives. These polymers are characterized in that they are comprised of liquid polyene compositions containing at least two unsaturated carbon to carbon bonds per molecule located terminally or pendant on the main chain backbone and are cured to odorless tacky elastomeric products with polythiols under ambient conditions in the presence of a free radical generator. The cured products in a preferred embodiment are used as adhesives that are firmly bonded to flexible substrates and are useful as adhesive tapes, and adhesives for self-adhering labels, tiles, plaques, posters, wall coverings and other articles.

5 Claims, No Drawings

FULLY CURED CROSSLINKABLE PRESSURE SENSITIVE ADHESIVE MATERIALS AND METHOD OF MAKING SAME

This application is a continuation-in-part of our copending application having Ser. No. 159,000, filed July 1, 1971, now abandoned, which in turn is a continuation-in-part of our application having Ser. No. 142,346, filed May 11, 1971, now abandoned, which in turn is a continuation-in-part of our application having Ser. No. 59,003, filed July 28, 1970, now abandoned, all of which are incorporated herein by reference.

BACKGROUND OF THE INVENTION

This invention relates to pressure sensitive polythioether adhesives as coatings on a first substrate to product a means of attaching a first substrate to a second substrate.

It is well known in the art to coat at least one side of flexible substrates such as cellophane, transparent and opaque plastics, woven fabrics and metals with a tacky adhesive so that when this substrate is overlayed on a second substrate and pressure applied, the two substrates will adhere. It is also known (U.S. Pat. Nos. 2,532,011 and 2,607,711) to handle and store such coated substrates in a wound roll condition in what have become generically known as adhesive tapes. The general method of construction for such tapes is to coat the first surface of a plastic or similar material with a backsize coating. Next, the second surface of the substrate is coated with a primer coating to produce a stronger bond between the substrate and the adhesive composition which is then applied. The adhesive composition is in solvent solution and the solvent is removed by heating to cure the adhesive to a tacky state. The coated substrate is wound into rolls.

The back-size coating is required to insure that the degree of adhesion of the tacky adhesive to the second surface on winding is less than the adhesion of the tacky adhesive to the first surface to which it was coated. Without such a coating, the adhesive tape could lose most of its useful adhering efficiency in that the tacky adhesive would pull off the coated surface, i.e., delaminate. It is also desired that the roll unwind with relative ease, both as the finished tape (e.g., 1-inch wide rolls) and in the full width master roll for processing ease. Too high an unwind force causes excessive stretching of the backing, which in turn causes loss of crepe for paper tapes, and core crushing or telescoping of the roll in storage for film tapes.

The primer coat is used with many substrates to insure a strong bond between the adhesive composition and the surface of the substrate. After tapes are used for masking or holding, they often must be removed and discarded. A tape is required which will strip off cleanly under severe removal conditions leaving the surface clean and free of adhesive.

The present invention is an improvement over conventional adhesive tapes in several ways. First, the adhesive tape of the present invention is constructed using simple 100 percent solids coating and curing techniques. This eliminates the need for solvents which can cause fire hazards and air pollution problems during the solvent-removal step. The elimination of solvents also eliminates the need for heat which can cause distortion of the substrate.

However, it is possible, in order to obtain adhesives with different physical characteristics such as low viscosity, better wettability, low coating weight and uniformity, to dissolve the polymer in solvents. Typical but not limiting examples of solvents are: aliphatic or aromatic hydrocarbons, ketones, alcohols, aliphatic or aromatic esters, halogenated hydrocarbons, et cetera. The solution concentration may vary as desired, but preferably is between 5 to 79 percent based on total solids.

The operability of emulsifying the polymer in water or water in the polymer by the use of well known techniques is also covered by the present invention.

The use of solution or emulsion adhesives does not affect the principle of the present invention, but may be useful in normal practice in order to change the physical properties and the ease of handling of the adhesive without altering the main properties of the finished products.

A second improvement is the preferential adhesion of the adhesive mass to the substrates upon which it is cured. This eliminates in many applications, the need for primer coats and back-size coats.

A third improvement is that the cured compositions described are sufficiently tacky in and out of themselves and do not generally require the addition of a tackifying resin.

It is an object of this invention to set out a tacky adhesive material useful for joining two substrates, which does not require the removal of solvent.

It is an object of this invention to set out a rapid, efficient method of coating an adhesive material onto a substrate and curing, whereby the adhesion to said substrate is greater than the adhesion to any subsequently contacted substrate.

It is also an object of this invention to disclose an adhesive tape which, when wound to form a roll, does not require the use of back-size agents or primers so that the roll can be unwound without the adhesive adhering to the uncoated surface of the tape on which it was wound.

BRIEF SUMMARY OF THE INVENTION

The present invention comprises tacky polythioether adhesives, consisting essentially of a liquid polyene containing at least two unsaturated carbon to carbon bonds per molecule located terminally, pendant or on the main chain backbone which are cured to odorless, tacky, elastomeric products with polythiols under ambient conditions in the presence of a free radical generator. Such generators are ultraviolet (UV) or beta ($\beta$) radiation or chemical free radical generating agents. These tacky adhesives in a preferred embodiment are coated on a first surface of a flexible substrate, cured and the substrate wound on itself to produce an adhesive tape not requiring backsize agents; and wherein when unwound, the tacky adhesive firmly adheres to the surface to which it was coated.

DETAILED DESCRIPTION OF THE POLYTHIOETHER CHEMISTRY

Broadly, the present invention encompasses liquid polyenes and polyynes which are cured with polythiols to a tacky condition in the presence of a free radical generator and are useful pressure sensitive adhesives. As used herein, polyenes and polyynes refer to simple or complex species of alkenes or alkynes having a multiplicity of preferably pendant, terminally or near terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this is monovinylacetylene, which is a polyeneyne under our definition. For purposes of brevity, all these classes of compounds will be referred to hereafter as polyenes.

As used herein for determining the preferred position of the reactive functional carbon to carbon unsaturation, the term "terminal" is meant that the functional unsaturation is not more than 16 carbon atoms away from an end of the main chain in the molecule. The term "pendant" means that the reactive carbon to carbon unsaturation is located terminally or near-terminally in a branch of the main chain as contrasted to a position at or near the ends of the main chain. For purposes of brevity, all of these positions will be referred to generally as "terminal" unsaturation.

The liquid polyenes preferred in the instant invention contain one or more of the following types of non-aromatic and non-conjugated "reactive" carbon to carbon unsaturation:

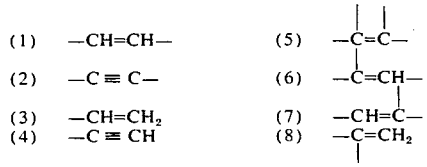

These functional groups as shown in 1–8 supra in the preferred instance are situated in a position which is either pendant, terminal or near terminal with respect to the main chain, and are free of terminal conjugation. As used herein, the phrase "free of terminal conjugation" means that the terminal "reactive" unsaturated groupings are not linked directly to non-reactive unsaturated species such as

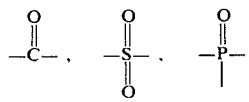

and the like, so as to form a conjugated system of unsaturated bonds exemplified by the following structure:

etc. On the average, the polyenes must contain 2 or more "reactive unsaturated carbon to carbon bonds/molecule and have a viscosity in the range from essentially 0 to 20 million centipoises at 70°C. These preferred polyenes have molecular weights in the range of 64–40,000, preferably 500 to 20,000.

A second group of polyenes operable in the instant invention includes unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber, and the like; unsaturated polyesters, polyamides, and polyurethanes derived from monomers containing "reactive" unsaturation, e.g., adipic acid-butenediol, 1,6-hexanediamine-fumaric acid and 2,4-tolylene diisocyanate-butenediol condensation polymers and the like.

A third group of polyenes operable as part of the composition in this invention includes those polyenes in which the reactive unsaturated carbon to carbon bonds are conjugated with adjacent unsaturated groupings. Examples of operable reactive conjugated ene systems include, but are not limited to the following:

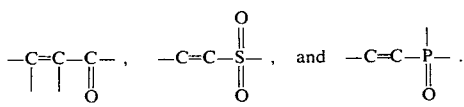

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1,175, the triacrylate of the reaction product of trimethylolpropane with 20 moles of ethylene oxide, and the like.

As used herein, the term "reactive" unsaturated carbon to carbon groups means groups having the structures as shown in 1–8 supra which will react under proper conditions as set forth herein with thiol groups to yield the thioether linkage

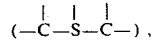

as contrasted to the term "unreactive" carbon to carbon unsaturation which means

groups when found in aromatic nuclei (cyclic structures exemplified by benzene, pyridine, anthracene and the like) which do not under the same conditions react with thiols to give thioether linkages. In the instant invention, products from the reaction of polyenes with polythiols which contain 2 or more thiol groups per average molecule are called polythioether polymers or polythioethers.

The polyenes operable in the instant invention are those having a molecular weight in the range 64 to 100,000, a viscosity ranging from essentially 0 to 100 million centipoises at 70°C of the general formula: $[A\text{+}X)_m$ wherein X is a member of the group consisting of

and R—C ≡ C—; $m$ is at least 2, R is independently selected from the group consisting of hydrogen, halogen, aryl, substituted aryl, cycloalkyl, substituted cycloalkyl, aralkyl, substituted aralkyl and alkyl and substituted alkyl groups containing one to 16 carbon atoms and A is a polyvalent organic moiety free of (1) reactive carbon to carbon unsaturation and (2) unsaturated groups in conjugation with the reactive ene or yne groups in X. Thus, A may contain cyclic groupings and minor amounts of hetero atoms such as N, P or O but contains primarily carbon-carbon, carbon-oxygen or silicon-oxygen containing chain linkages without any reactive carbon to carbon unsaturation.

Examples of operable polyenes include, but are not limited to 1. crotyl-terminated polyurethanes which contain two "reactive" double bonds per average molecule in a near terminal position of the average general formula:

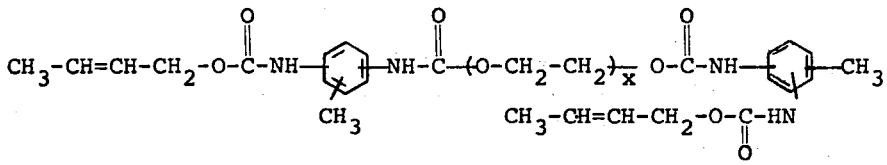

wherein X is at least 1, 2. ethylene/propylene/non-conjugated diene terpolymers, such as "Nordel 1040" manufactured by duPont which contains pendant "reactive" double bonds of the formula: $-CH_2-CH=CH-CH_3$, 3. The following structure which contains terminal "reactive" double bonds:

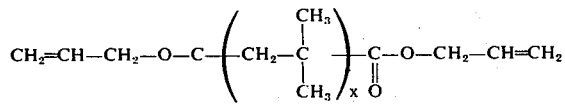

where $x$ is at least 1.

4. The following structure which contains near terminal "reactive" double bonds

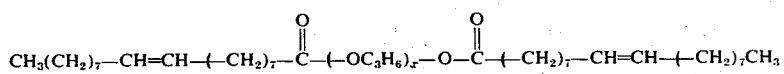

where $x$ is at least 1.

As used herein, the term polythiols refers to simple or complex organic compounds having a multiplicity of pendant or terminally positioned —SH functional groups per average molecule.

On the average, the polythiols must contain 2 or more —SH groups/molecule. They usually have a viscosity range of essentially 0 to 20 million centipoises (cps) at 70°C as measured by a Brookfield Viscometer. Included in the term "polythiols" as used herein, are those materials which in the presence of an inert solvent, aqueous dispersion or plasticizer fall within the viscosity range set out above at 70°C. Operable polythiols in the instant invention usually have molecular weights in the range 50–20,000, preferably 100–10,000.

The polythiols operable in the instant invention can be exemplified by the general formula: $R_8-(SH)_n$ where $n$ is at least 2 and $R_8$ is a polyvalent organic moiety free from reactive carbon to carbon unsaturation. Thus $R_8$ may contain cyclic groupings and minor amounts of hetero atoms such as N, P or O but primarily contains carbon-carbon, carbon-hydrogen, carbon-oxygen, or siliconoxygen containing chain linkages free of any reactive carbon to carbon unsaturation.

One class of polythiols operable with polyenes in the instant invention to obtain essentially odorless polythioether products are esters of thiol-containing acids of the general formula: $HS-R_9-COOH$ where $R_9$ is an organic moiety containing no "reactive" carbon to carbon unsaturation with polyhydroxy compounds of the general structure: $R_{10}-(OH)_n$, where $R_{10}$ is an organic moiety containing no "reactive" carbon to carbon unsaturation and n is 2 or greater. These components will react under suitable conditions to give a polythiol having the general structure:

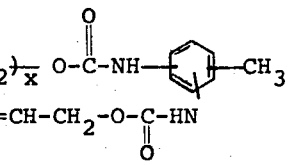

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol, tolylene-2,4-dithiol, etc. and some polymeric polythiols such as a thiol-terminated ethylcyclohexyl dimercaptan polymer, etc., and similar polythiols which are conveniently and ordinarily synthesized on a commercial basis, although having obnoxious odors, are operable in this invention, but many of the end products are not widely accepted from a practical, commercial point of view. Examples of the polythiol compounds preferred for this invention because of their relatively low odor level include, but are not limited to, esters of thioglycolic acid ($HS-CH_2COOH$), β-mercaptopropionic acid ($HS-CH(CH_3)-COOH$) and β-mercaptopropionic acid ($HS-CH_2CH_2COCH$) with polyhydroxy compounds such as glycols, triols, tetraols, pentaols, hexaols, etc. Specific examples of the preferred polythiols include but are not limited to ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropyleneether glycol (e.g., Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

As used herein, the term "odorless" means the substantial absence of the well-known offensive and sometimes obnoxious odors that are characteristics of hydrogen sulfide and the derivative family of compounds known as mercaptans.

As used herein, the term "non-yellowing" means the substantial resistance during prolonged exposure to actinic radiation (such as exposure outdoors in sunlight, etc.) to unsightly or uncontrollable discoloration.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality of three. A polymeric dithiol is a polythiol with an average of two thiol groups per molecule and thus has a functionality of two.

It is further understood and implied in the above definitions that in these systems, the functionality of the polyene and the polythiol component is commonly expressed in whole numbers, although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100 percent of the theoretical value for complete reaction, the functionality (assuming 100 percent pure starting materials) would be 2.0. If, however, the reaction were carried to only 90 percent of theory for complete reaction, about 10 percent of the molecules present would have only one ene functional group, and there may be a trace of material that would have no ene functional groups at all. Approximately 90 percent of the molecules, however, would have the desired diene structure and the product as a whole then would have an actual functionality of 1.9. Such a product is useful in the instant invention and is referred to herein as having a functionality of 2.

The aforesaid polyenes and polythiols can, if desired, be formed or generated in situ and still fall within the scope of the instant invention.

A general method of forming one type of novel polyenes containing urethane groups is to react one or more polyols of the general formula $R_{11}\text{+}OH)_n$ wherein $R_{11}$ is a polyvalent organic moiety free from reactive carbon to carbon unsaturation and $n$ is at least 2 with a polyisocyanate of the general formula $R_{12}\text{+}NCO)_n$ wherein $R_{12}$ is a polyvalent organic moiety free from reactive carbon to carbon unsaturation and $n$ is at least 2 and a member of the group consisting of an ene-ol, yne-ol, ene-amine and yne-amine. The reaction is carried out in an inert moisture-free atmosphere (nitrogen blanket) at atmospheric pressure at a temperature in the range 0°–120°C for a period of 5 minutes to 25 hours. In the case where an ene-ol or yne-ol is employed, the reaction is preferably a one step reaction wherein all the reactants are charged together. In the case where an ene-amine or yne-amine is used, the reaction is preferably a two step reaction wherein the polyol and the polyisocyanate are reacted together and thereafter preferably at room temperature, the ene-amine or yne-amine is added to the NCO terminated polymer formed. A preferred polyene for use in pressure sensitive adhesives is made by chain extending a high molecular weight polypropylene glycol with toluene diisocyanate and capping with allyl alcohol Such polyenes are represented by the formula $P_nT_{n+1}A_2$ where P equals polypropylene glycol, T equals toluene diisocyanate and A equals allyl alcohol. The relatively low concentration of double bonds affords a relatively low crosslink density after reaction with the polythiol. The resulting cured composition is an elastomeric, permanently tacky material.

A second general method of forming novel polyenes containing urethane groups (or urea groups) is to react a polyol (or polyamine) with an ene-isocyanate or an yne-isocyanate to form the corresponding polyene. The general procedure and stoichiometry of this synthesis route is similar to that described for polyisocyanates in the preceding paragraph.

In forming the novel urethane-containing polyenes of the instant invention, catalytic amounts of a catalyst may be employed to speed up the reaction. This is especially true in the case where an ene-ol is used to form the polyene. Said catalysts are well known to those in the art and include organometallic compounds such as stannous octoate, stannous oleate, dibutyl tin dilaurate, cobalt acetylacetonate, ferric acetylacetonate, lead naphthenate and dibutyl tin diacetate.

Another type of novel polyene are those containing ester groups. This type of polyene can be formed by reacting an acid of the formula $R_{13}\text{+}COOH)_n$ wherein $R_{13}$ is a polyvalent organic moiety free from reactive carbon to carbon unsaturation and $n$ is at least 2 with either an ene-ol or yne-ol. The reaction is carried out in an inert moisture-free atmosphere (nitrogen blanket) at atmospheric pressure at a temperature in the range 0°–120°C for a period of 5 minutes to 25 hours. Usually the reaction is carried out in the presence of a catalyst (p-toluenesulfonic acid) and in the presence of a solvent, e.g., benzene at refluxing temperature. The water formed is azeotroped out of the reaction. Another method of making the ester containing novel polyenes is to react a polyol of the formula $R_{11}\text{+}OH)_n$ wherein $R_{11}$ is a polyvalent organic moiety free from reactive carbon to carbon unsaturation and $n$ is at least 2 with either an ene-acid or an yne-acid. The reaction is carried out in the same manner as set out above for the ester-containing novel polyenes. In practicing this latter technique, however, we have found that ene-acids (or yne-acids) in which the ene (or yne) group is adjacent to an "activating" polar moiety such as

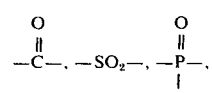

etc., are generally not desirable within the scope of this invention. These "activated" ene compounds are very prone to self-polymerization reactions to form vinyl polymers. Excessive amounts of self-polymerization of the ene groups is an undesirable side reaction in the present invention, since the desired polythioether reaction products are precluded whenever self-polymerization of the ene groups occurs.

Yet another method for producing polyenes comprises reacting either:

A. An organic epoxide containing at least two

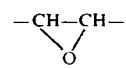

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or B. An organic epoxide containing at least one organic substituent containing a reactive ethylenically or ethynylically unsaturated group with a member of the group consisting of hydrazine and an organic material containing at least two active hydrogen functions from the group consisting of

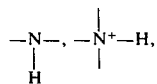

—OH, —SH, —B—H, and —P—H.

In one of its simplest forms, these two routes (a) and (b) can be exemplified by but are not limited by the following equations:

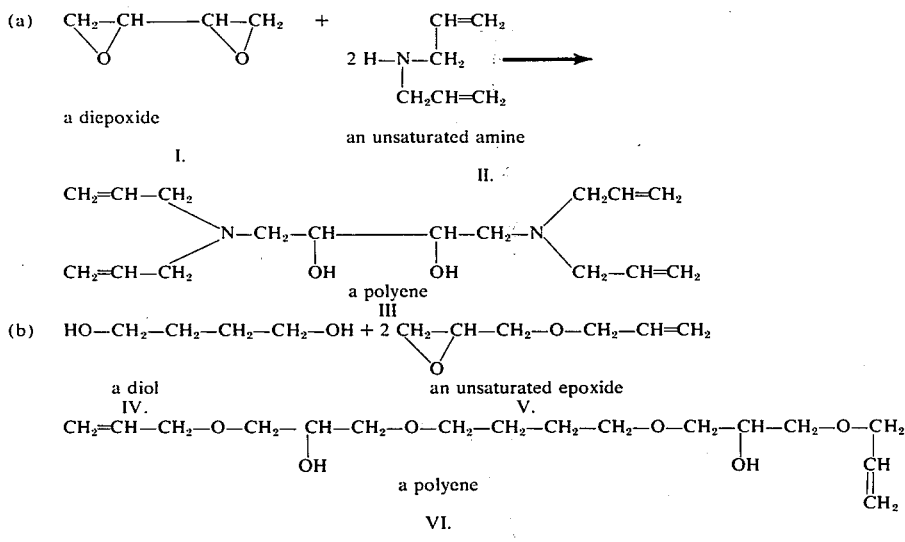

In the above equations, the reactants may be of virtually any molecular weight (i.e., both monomeric or polymeric species). Further, the reactants may vary individually in functionality over quite a wide range, the only restriction being that the final -ene or -yne functionality of the product polyene (or polyene) must be at least two.

The curing reaction of the polyene and polythiol can be initiated by any free radical mechanism which dissociates or abstracts a hydrogen atom from the SH group (or accomplishes the equivalent thereof) and which is operable under ambient conditions. Thus, it is possible merely to expose the polyene and polythiol admixture to ambient conditions (oxygen from the air is the initiator) and obtain a cured solid elastomeric or resinous product. Azo compounds or peroxides (with or without amine accelerators) which decompose at ambient conditions are also operable as free radical generating agents capable of curing the components of the instant invention to solid odorless elastomeric or resinous polymer products. Additionally, ultraviolet light (with or without chemical photoinitiators or sensitizers such as benzophenone, acetophenone, acenaphthenequinone, methyl ethyl ketone, etc.) or other forms of energetic radiation yield rapid cures by the practice of the instant invention. In the case of pressure sensitive adhesives, UV radiation or electron beam irradiation are the preferred methods of initation.

Useful method of compounding is to prepare in an ambient atmosphere by conventional mixing techniques but in the absence of actinic radiation, a composition consisting of polyene, polythiol, UV sensitizer or photoinitiator, and any other additives, e.g. an antioxidant if desired to inhibit spontaneous curing. This composition can be stored in the dark for extended periods of time, but on exposure to actinic radiation (e.g., ultraviolet light, sunlight, etc.), will cure controllably and in a very short time period to elastomeric polythioether products.

The curing period can be retarded or accelerated so that it can vary from less than 1 minute to 30 or more days. Conventional curing initiators or accelerators operable in the instant invention include, but are not limited to peroxides, hydroperoxides; peracids; persulfates, azo compounds such as azobis-isovaleronitrile; ultraviolet light (with and without co-agent sensitizers); high energy radiation such as x-rays, $\beta$-rays, electron beams, gamma radiation, and the like; ozone, oxidizing agents such as $PbO_2$; and cyclohexanone peroxide with dimethyl aniline. Conventional curing inhibitors or retarders operable in the instant invention include but are not limited to hydroquinone; p-tert-butyl catechol; 2,6-ditert-butyl-p-methylphenol; phenothiazine; N-phenyl-2-naphthylamine; and the like.

APPLICATION TO PRESSURE SENSITIVE ADHESIVE SYSTEMS

Broadly, the pressure sensitive polythioether adhesives of this invention are produced by any of the above techniques so as to be in a tacky, elastomeric condition. Not all crosslinked compositions of polyenes and polythiols are suitable as pressure sensitive adhesives. In the practice of this invention, in order to achieve the desired tacky, elastomeric properties, the cured compositions must have a relatively low crosslink density, i.e., number of crosslinks per unit weight of cured composition. Low crosslink density is obtained by one or more of the following:

1. employing a polyene with high equivalent weight, i.e., low concentration of unsaturated groups per unit weight of polyene.
2. employing a polythiol of high equivalent weight, i.e., low concentration of thiol groups per unit weight of polythiol, 3. using a molar ratio of "ene" groups to thiol groups substantially different from the stoichiometrically equivalent ratio,
4. using polyenes and polythiols that have functionalities, i.e., number of "ene" groups or number of thiol groups per molecule, of about 2.

Preferred backbone structures of the polyene and polythiol are ones which are essentially non-crystalline.

The functionality of the polyene is set on production of the polyene. For instance, by varying the ratio of polyisocyanate to ene-ol, the functionality can be adjusted. By varying from stoichiometric reaction conditions, the functionality is readily decreased, altering the properties, e.g., tackiness, of the elastomer. For certain of these polyisocyanate/ene-ol systems, the operable range of concentration variation varies from that of equivalent stoichiometry, producing for example a functionality of about 4 to 8, down to a functionality of about 2, which is necessary for producing a final polythioether on the subsequent reaction with a polythiol.

The degree of tackiness is also dependent on the reaction ratios of polyene to polythiol in producing the polythioether. By varying the relative concentration of these reactants, the degree of curing, and the properties of the resulting polythioether elastomer can be controlled. Stoichiometric ratios may be used, and particularly when the functionality of the polyene is in the range of 2. However, in a preferred embodiment, it has generally been found that by using an amount of polythiol somewhat less than sufficient to satisfy the complete functionality of the polyene, very useful pressure sensitive adhesives are formed. Such polythioether elastomers do not cure to hard resins, but rather cure to elastomeric tacky materials.

The degree of tackiness is also dependent on the equivalent weight of the polyene. A high equivalent weight of polyene will have a low crosslink density and a higher degree of tack than a similar composition of lower equivalent weight.

Partial curing is a poor way to obtain tack. The preferred method is to control degree of tack by the foregoing methods and to cure the composition completely.

Alternatively the tack can be enhanced by the addition of tackifying resins. The pressure sensitive adhesives described in this invention are generally complete adhesives. No tackifying resin is normally required, as is the case for solvent type rubber based pressure sensitives. If desired, however, conventional tackifiers can be added. Examples of conventional tackifiers include but are not limited to polyterpene resins, e.g. ZONAREZ (Arizona Chemical Co.) or hydrogenated resin esters, e.g., "Stabelite Ester 3" (Hercules Co.), synthetic terpene resins, e.g., Arkon P 115 (Arakawa Forest Co.), hydrocarbon resins, e.g., Escorez ECR 5 (Esso Chemicals), polystyrene resins, e.g., Piccolastic A5 (Picco Chem Corp.)

CALCULATION OF THEORETICAL CROSSLINK DENSITY

The theoretical crosslink density in a fully cured polyene/polythiol composition is readily calculated. Herein, the crosslink density ($X$) is defined as the milliequivalents of crosslink sites per gram of composition. The crosslink sites originate either from a polyene or a polythiol molecule. Thus, $$X = X_e + X_t \tag{1}$$

where the subscript $e$ refers to polyene and $t$ to polythiol. Assuming that there may be more than one type of polyene and polythiol, but that all ene and thiol groups are equally reactive, Equation (1) is then written $$X = P_e \Sigma (Ef_e) + P_t \Sigma (Tf_t) \tag{2}$$

wherein $P_e$ and $P_t$ are the probabilities that any one group will react; $E$ and $T$ are the original concentrations of ene or thiol groups, respectively, of each polyene and each polythiol in milliequivalents per gram of total composition; and $f_e$ and $f_t$ are the fraction of the ene or thiol groups, respectively, on each polyene or polythiol molecule that represent potential crosslink sites as oposed to chain extension sites. For purposes of this calculation, one milliequivalent of unsaturation is equal to one millimole of unsaturation. Thus, one milliequivalent of unsaturation will react completely with one milliequivalent of thiol.

To obtain the theoretical crosslink density, it is assumed that the curing reaction proceeds to completeness, i.e. until either all the ene groups or all the thiol groups are reacted. When the total number of ene groups and thiol groups are equal ($\Sigma E = \Sigma T$), then all groups will react, and $P_e = P_t = 1$.

When there are fewer thiol groups than ene groups ($\Sigma T < \Sigma E$), all the thiol groups will react, but the number of ene groups which react will be proportional to the ratio of thiol to ene groups. In this case the probability of a given member of each group reacting is expressed by $P_t = 1$ and $p_e = \Sigma T/\Sigma E$.

Conversely, when there are fewer ene groups than thiol groups ($\Sigma E < \Sigma T$), all the ene groups will react, but the number of thiol groups which react will be proportional to the ratio of ene groups to thiol groups. Thus the probability of a given member of each group reacting is expressed by $p_e = 1$ and $P_t = \Sigma E/\Sigma T$.

As an example, to find the theoretical crosslink density for a composition containing 85 parts by weight of a tetrafunctional polyene of MW = 1776, 10 parts by weight of a tetrafunctional polythiol of MW = 488 and 5 parts by weight of a difunctional polythiol of MW = 238, the following calculations are carried out.

The ene concentration in milliequivalents per gram of composition is $$\Sigma E = E_1 = \frac{(4)(1000)(0.85)}{1776} = 1.914.$$

The thiol concentration in milliquivalents per gram of composition are $$T_1 = \frac{(4)(1000)(0.10)}{488} = 0.819,$$

$$T_2 = \frac{(2)(1000)(0.05)}{238} = 0.420$$

and
$$\Sigma T = T_1 + T_2 = 1.239.$$

Since $\Sigma T < \Sigma E$, the probabilities of reaction for each group become $$P_t = 1 \text{ and } P_e = \frac{\Sigma T}{\Sigma E} = \frac{1.239}{1.914} = 0.647.$$

Each polyene molecule has four ene groups, of which two are crosslink sites. Similarly the tetrafunctional polythiol has two crosslink sites, but the difunctional polythiol has none. Hence, the fraction of groups on each molecule that are potential crosslink sites are
$f_e = 2/4 = 0.5, f_{t1} = 2/4 = 0.5,$ and $f_{t2} = 0/2 = 0$ respectively.

When these values are substituted into Equation (2) i.e.,
$X = P_e E f_e + P_t (T_1 f_{t1} + T_2 f_{t2}) = (0.647)(1.914)(0.5) + (1)[(0.819)(0.5) + (\mathbf{0.420})(0)] = 1.029,$
the polyene/polythiol composition when fully cured contains 1.029 milliequivalents of crosslink sites per gram.

DISTINCTION BETWEEN THE SYSTEMS OF THIS INVENTION AND OTHER POLYTHIOETHERS

Prior to the present invention there have been reported polyene/polythiol systems which can be cured by exposure to ultraviolet light (see for example U.S. Pat. No. 3,661,744). These compositions have resulted in non-tacky solid products. Although their application as "adhesives" has been described, this is to be understood in the sense of conventional or structural adhesives. For such applications, the uncured composition would generally be applied to one or both of the surfaces to be joined, these surfaces would then be contacted, and finally the adhesive would be cured to form a permanent bond between the two surfaces.

By contrast, this invention since it is directed to a pressure sensitive adhesive employs an entirely different sequence. The uncured composition is applied to a substrate and the composition is cured to a firm but permanently tacky condition. For use, this cured tacky surface is pressed into contact with a second substrate. The cured compositions previously described (U.S. Pat. No. 3,661,744), although their chemistry is similar, are not suitable for use as pressure sensitive adhesives since they do not possess sufficient tack.

The compositions of U.S. Pat. No. 3,661,744 were directed towards applications requiring a product of relatively high intrinsic strength. This was achieved by selection of a polyene/polythiol recipe capable of producing relatively high crosslink density upon curing. By contrast this invention does not require high intrinsic strength, since the strength is afforded by the substrate onto which the adhesive is coated. Furthermore, to achieve the required tackiness to be suitable as a pressure sensitive adhesive, it has been found that a relatively low crosslink density is required.

To be suitable for use as a pressure sensitive adhesive, it is critical that the crosslink density be within a certain range. If the crosslink density is too high, the cured composition does not possess sufficient tack to be useful. If the crosslink density is too low, the composition will have insufficient cohesive strength to remain attached to the backing material. It will appear to be still liquid and will tend to "transfer" when contacted with another surface.

The operable range herein for crosslink density is between 0.001 and 0.230 milliequivalents of crosslink sites per gram of composition and preferably 0.010 to 0.200 milliequivalents per gram. These values represent the theoretical crosslink density, assuming that all possible ene/thiol reactions have occurred; i.e., that either all the ene or all the thiol groups or all of both have been consumed.

Furthermore it is necessary that the uncured polyene/polythiol composition be a liquid under ambient conditions in order to obtain a pressure sensitive adhesive. Solid polyene/polythiol compositions even though they may fall within the operable crosslink density range are inoperable since they result in a non-tacky product on curing.

OTHER CONSIDERATIONS IN THE OPERATION OF THIS INVENTION

Because the curable liquid polymers used as pressure sensitive adhesives are chemically cured in contact with the backing, this normally results in good adhesion of the adhesive layer to the backing. As a result, the usual primer coat common in solvent-type rubber based pressure sensitive adhesives may not be required. For some types of backing, however, a primer coat or pre-treatment may still be desirable. Conventional primer coats are operable herein including but not limited to solutions of natural rubber or urethane elastomer. A pretreatment such as corona treatment is also operable as a primer herein.

In the standard pressure sensitive adhesive, pigments, dyes and fillers are used in order to impart color or opacity to the adhesive. In the case of the coatings claimed in this patent, this is also possible if the curing is obtained using x-rays, gamma and beta radiations, peroxides or oxygen.

In the case of UV light curing, the pigments, dyes and fillers must be selected according to their transparency to UV light radiations. Typical, but not limiting examples are: barium and calcium salts, zinc oxide, titanium dioxide, etc.

In conventional pressure sensitive adhesives a back-size or release coat is generally required to allow easy unwinding of the adhesive tape. The back-size coating reduces the adhesion between the adhesive and the next layer of backing. Obviously the need for a back-size coating will be dependent upon both the composition of the adhesive and the backing. We have found that with our coatings on some backings, a back-size coating is usually not required. For other backings, a release coating may be desirable. Typical release coats include but are not limited to the reaction product of octadecyl isocyanate and polyvinyl alcohol as described in U.S. Pat. No. 2,532,011, and polysiloxanes as described in U.S. Pat. 3,061,567.

Although free radical curing of the polyene-polythiol composition may be by chemical or radiation techniques, it is preferred to use radiation methods. In a preferred embodiment of the present invention, the liquid polythioether elastomer is coated on a flexible substrate by any one of a number of standard techniques, such as spraying, knife, squeeze roll, such as extrusion lamination, reverse rolls, direct gravure, indirect gravure, slotted head curtain coater coextrusion, etc. and passed through a radiation zone. The radiation cures the adhesive to a tacky condition and simultaneously firmly bonds the adhesive to the substrate. The cured adhesives are termed "encohesive," by which it is meant that they are more adhesive to the surface on which they were coated and cured, than adhesive to any surface which they will subsequently contact. A standard chemical photoinitiator may also be used. The flexible substrates that are coated with these polythioether elastomers include plastics, woven fabrics, nonwoven fabrics, papers, metal foils, plastic coated fabrics and so on. The end items that are produced include adhesive tapes, cellophane tapes, masking and other paper tapes, labels, ribbons, aluminum foil tapes, woven fabric mending tapes, fiberglass tapes, plastic impregnated fabric tapes and so on.

Further, this pressure sensitive adhesive is not limited solely to use in tapes. It may be used wherever one substrate is to be pressure bonded to another. These further include use on ceramic, asphalt, plastic or rug tiles, acoustic tiles, billboard displays, posters, signs, wall coverings, plaques and so on. In these uses, a backing is removed exposing the adhesive layer, and the tile, poster or other object is overlayed the surface to which it is to be applied. In this case, the polymer will be coated on any suitable release backing such as silicone paper or polyethylene film cured and the composition can then be used as an adhesive film useful to bond together any suitable substrates. This secures it firmly to the surface on which it was overlaid.

In one particular and preferred view, the present invention comprises a polyene preferably having a functionality of about 2 to 4 mixed with a polythiol having a functionality of about 2 to 4 wherein the total available thiol groups are somewhat less than the total available ene groups. A coating of 0.5 to 3 mils is applied to clear plastic which may be any conventional material used as a backing including cellophane, cellulose acetate, cellulose butyrate, polyethylene, polyethylene terephthlate, polypropylene, polybutylene, polyvinyl chloride, polyvinylidene chloride, polyvinyl butyral, polyvinyl acetate, copolymers of vinyl acetate, vinyl chloride or vinylidene chloride backing substrate. The backing substrate is from about 1 to 40 mils in thickness and 1/2 to 60 inches wide or wider. This coated plastic is exposed to ultraviolet radiation having an intensity in the range of about 4,000–40,000 microwatt/cm$^2$ for from about 1 to 300 seconds; or to beta ($\beta$) radiation of from about 0.1 to 10.0 megarads. When the substrate is transparent and the curing radiation is ultraviolet light, this radiation may be applied to either side of the substrate. However, when the substrate is opaque, ultraviolet radiation must be applied to the surface carrying the polyene-polythiol mixture. In the instance when beta radiation is used, it may generally be applied to either surface irrespective of the type of substrate. The resulting coated strip is then wound to form a roll. No backsize or other coating is applied to the surface to which the surface will contact prior to winding. Such a backsize may be used, but it is not necessary, since the cohesive force of the adhesive is substantially greater than its adhesive force. The strip is unwound by a force of from 1 to 4 lbs/inch, with the adhesive remaining on the surface to which it was coated and cured. For testing, strips are overlayed on a piece of transparent glass, stainless steel, polyvinyl chloride, cellulose acetate, and polyethylene terephthalate, and pressed to an intimate contact using a 4 1/2 lb. roller 1.75 inch in width as described in Method PSTC-1 of the Pressure Sensitive Tape Council. A force of 1 to 5 lbs./inch at a peel rate of 12 feet/minute is required to remove the strip from the substrate, with no delamination of the adhesive from the strip.

In a further embodiment of this invention, the adhesive on the substrate may also be of a type which will further cure after having been pressure applied to a second substrate. In this embodiment, the ambient ultraviolet radiation may be used to further cure the tacky adhesive, or such ultraviolet can be supplied from some man-made source, or further beta radiation may be used. In such a further embodiment, the adhesive article can be stored in a light shielded manner so as to prevent premature further cure.

The molecular weight of the polyenes in the following examples are measured by various conventional methods, including solution viscosity, osmotic pressure and gel permeation chromatography. Additionally, the molecular weight can be calculated from the known molecular weight of the reactants. The viscosities of the polyenes and polythiols is measured on a Brookfield Viscometer Model LVT.

The following examples will aid in further explaining, but should not be deemed as limiting, the instant invention. In all cases, unless otherwise noted, all parts and percentages are by weight.

EXAMPLE I

A solution of 2025 g. (1 mole) of polypropylene glycol of MW 2025 and 100 g. (0.17 mole) of polyethylene glycol of MW 600 was heated at 70°–100°C at 5 mm Hg for 1.5 hours to remove volatiles. The outgassed solution was cooled to 60°C and to it was added 271 g. (1.56 moles) of tolylene diisocyanate (80/20 mixture of the 2,4-and 2,6-isomers) over a 1 hour period, maintaining the temperature at 60°–70°C. To the mixture was then added 5 g. of dibutyltin dilaurate catalyst, and heating was continued at 60°–70°C for 1 hour. To the mixture was then added 116 g. (2 moles) of allyl alcohol, and stirring and heating at 60°–70°C were continued for about 3 hours until essentially all of the isocyanate groups had reacted as determined by analysis. The liquid product was then purged of residual volatiles by a stream of dry nitrogen with stirring at 70°–100°C at 1-10 mm Hg for 2 hours. The resulting colorless liquid prepolymer diene was found upon analysis to contain 0.35 millimoles of unsaturation per gram, and had a Brookfield viscosity (Number 4 spindle) of 10,000 cps at 70°C.

EXAMPLE II 136 g. of pentaerythritol, 424 g. of $\beta$-mercaptopropionic acid, 50 g. of Amberlyst 15 cationic resin (Rohm and Haas) and 200 g. of toluene are charged into a flask connected to a Dean-Stark water trap. This mixture is refluxed at from 90°–115°C until the required amount of water (18 parts/106 parts $\beta$-mercaptopropionic acid) is collected by the azeotropic distillation of the toluene. The Amberlyst resin is removed by filtration from the cooled reaction solution, the flask purged with dry nitrogen, and the toluene removed by distillation under reduced pressure. The polythiol product, i.e., pentaerythritol tetrakis ($\beta$-mercaptopropionate) is recovered for formulation with the polymers. This tetrathiol has a theoretical molecular weight of 488 and will be referred to herein as Polythiol A.

EXAMPLE III 92 g. of glycerol, 218 g. of $\beta$-mercaptopropionic acid, 20 g. of Amberlyst 15 cationic resin (Rohm and Haas)

and 200 g. of toluene are charged into a flask connected to a Dean-Stark water trap. This mixture is refluxed at from 90°–115°C until the required amount of water (18 parts/106 parts β-mercaptopropionic acid) is collected by the azeotropic distillation of the toluene. The Amberlyst resin is removed by filtration from the cooled reaction solution, the flask purged with dry nitrogen, and the toluene removed by distillation under reduced pressure. The polythiol product, i.e. glyceryl tris(β-mercaptopropionate) is recovered for formulation with the polymers. This trithiol has a theoretical MW of 356 and will be referred to herein as Polythiol B.

EXAMPLE IV 1,020 g. of polypropylene glycol of MW 1025, 212 g. of β-mercaptopropionic acid, 100 g. of Amberlyst 15 cationic resin (Rohm and Haas) and 500 g. of toluene are charged into a flask connected to a Dean-Stark water trap. This mixture is refluxed at from 90°–115°C until the required amount of water (18 parts/106 parts β-mercaptopropionic acid) is collected by the azeotropic distillation of the toluene. The Amberlyst resin is removed by filtration from the cooled reaction solution, the flask purged with dry nitrogen, and the toluene removed by distillation under reduced pressure. The polythiol product, i.e., polypropylene glycol bis (β-mercaptopropionate) is recovered for formulation with the polymers. This dithiol has a theoretical MW of 1196 and will be referred to herein as Polythiol C.

EXAMPLE V

A mixture was made consisting of 100 parts by weight of the prepolymer from Example I, 3.0 parts of polythiol A from Example II, and 1.2 parts of benzophenone. This liquid mixture was spread onto a glass plate to a thickness of about 1 mil and exposed to ultraviolet radiation (about 4,000 microwatts/cm$^2$) from a Sylvania sunlamp. After 20 seconds exposure, the liquid had cured, affording a firm but tacky surface.

The same mixture was coated to a 1 mil thickness onto various 1 mil plastic backing sheets. The coatings were cured by exposure for 2 minutes under the sunlamp. After curing, various substrates were pressed into contact with the adhesive surface. The resulting forces required to remove the coated plastic backing from the substrates are set out in Table I. The procedure of ASTM D1000 was followed.

TABLE I

| Plastic Backing | Substrate Attached To By Pressure | Peel Angle | Force to Peel lbs/in. |
|---|---|---|---|
| Polyethylene Terephthalate | Polyethylene Terephthalate | 90° | 1.05 |
| Polyvinyl Chloride | Polyvinyl Chloride | 90° | 1.25 |
| Cellulose Acetate | Stainless Steel | 180° | 3.53 |
| Cellulose Acetate | Glass | 180° | 2.60 |
| Polyethylene Terephthalate | Stainless Steel | 180° | 1.99 |
| Polyethylene Terephthalate | Glass | 180° | 2.20 |

The adhesive layer did not delaminate from the plastic backing onto any of the substrates to which it was attached by pressure.

The polyene/polythiol composition of this example has a calculated theoretical crosslink density of 0.123 milliequivalents of crosslink sites per gram.

EXAMPLE VI

A mixture was made consisting of 100 parts by weight of the prepolymer from Example I, 48 parts of Polythiol B from Example III, and 0.6 part of benzophenone. This liquid mixture was spread onto a glass plate to a thickness of about 1 mil, and exposed to a sunlamp as in Example V. After 60 sec. exposure the liquid had cured to a firm but tacky surface.

The mixture of this example has a calculated theoretical crosslink density of 0.111 milliequivalents of crosslink sites per gram.

EXAMPLE VII

A mixture was made consisting of 100 parts by weight of the prepolymer from Example I, 3.0 parts of polythiol A from Example II, 11.8 parts of Polythiol C from Example IV and 0.6 part of benzophenone. This liquid mixture was spread onto a glass plate to a thickness of about 1 mil, and exposed to a sunlamp as in Example V. After 30 sec. exposure, the liquid had cured to a firm but tacky surface.

The same mixture was coated to a 1-mil thickness onto various 1-mil plastic backing sheets. The coatings were cured by exposure for 2 minutes under the sunlamp. After curing, various substrates were pressed into contact with the adhesive surface. The resulting forces required to remove the coated plastic backing from the substrates are set out in Table II. The procedure of ASTM D1000 is followed.

TABLE II

| Plastic Backing | Substrate Attached to by Pressure | Peel Angle | Force to Peel lbs/in |
|---|---|---|---|
| Polyethylene Terephthalate | Polyethylene Terephthalate | 90° | 1.25 |
| Polyvinyl Chloride | Polyvinyl Chloride | 90° | 1.81 |
| Polyvinyl Chloride | Polyvinyl Chloride | 90° | 2.43 |
| Cellulose Acetate | Cellulose Acetate | 90° | 3.85 |
| Polyvinyl Chloride | Stainless Steel | 180° | 3.00 |
| Polyvinyl Chloride | Glass | 180° | 2.65 |

The adhesive layer did not delaminate from the plastic backing onto any of the substrates to which it was attached by pressure.

The mixture of this example has a calculated theoretical crosslink density of 0.084 milliequivalents of crosslink sites per gram.

EXAMPLE VIII

This example illustrates the use of electron beam irradiation to effect the cure rather than ultraviolet light.

The mixture of Example VII was prepared except that the benzophenone was omitted. This mixture was spread onto cellulose acetate film to a thickness of about 1 mil. The coated film was passed below an 2 MeV electron beam from a Van de Graaff generator. A dose of 1.0 megarad was required to cure the mixture. The resulting surface had good tack and strength suitable for pressure sensitive adhesion.

EXAMPLE IX

To a 3 liter resin kettle equipped with a stirrer, thermometer, gas inlet and outlet was charged 1700 g. (0.838 mole) of a polyoxypropylene glycol commercially available from Union Carbide under the tradename "PPG-2025." The kettle was heated at 110°C with stirring for 2 hours at below 1 mm. Hg pressure to remove water and low boiling alcohols. The glycol was cooled below 60°C, and 187 g. (1.075 moles) of toluene diisocyanate (80/20 mixture of 2,4/2,6 isomer) was added with stirring. To the mixture was added 30.6 g. of dibutyltin dilaurate as a catalyst. The temperature rose rapidly after the catalyst addition, and was maintained at 70°-80°C until the NCO content (as determined by titration) was essentially 0.00 meg./g. (about 3–4 hours). The product was stripped at 110°C and 1mm. Hg for 2 hours to remove the excess allyl alcohol. This polyene was found to contain 0.30 millimole of unsaturation per gram.

An adhesive composition using this polyene was made up of 100 g. of the polyene, 3.06 g. of Polythiol A from Example II and 0.5 g. of benzophenone. The composition was mixed uniformly and coated onto a unplasticized polyvinyl chloride film backing to an adhesive thickness of about 2 mils. The coating was cured by irradiating for 1 minute under a 275 watt Westinghouse UV sunlamp supplying radiation at the coating at an intensity of 4,000 microwatts/cm$^2$. The 180°peel adhesion to stainless steel as measured by method PSTC-1 of the Pressure Sensitive Tape Council was 1.51 lbs./inch of width.

The peel adhesion was increased by decreasing the concentration of pentaerythritol tetrakis ($\beta$-mercaptopropionate), i.e., Polythiol A to 90 or 80% of the stoichiometric amount used in this example resulting in a 180° peel adhesion of 1.71 lbs./inch for the 90% and 2.06 lbs./inch for the 80% stoichiometry.

The calculated theoretical crosslink density of the mixture containing a stoichiometric amount of Polythiol A is 0.121 milliequivalents of crosslink sites per gram; for 90% stoichiometry it is 0.110 milliequivalents of crosslink sites per gram and for 80% stoichiometry it is 0.098 milliequivalents of crosslink sites per gram.

EXAMPLE X

This example shows how an increase in crosslink density results in a product having a lower degree of adhesion.

The polyene synthesis of Example 9 was followed except that the amounts of reactants were 1700 g. (0.838 moles) of PPG-2025, 224 g. (1.287 moles) of toluene diisocyanate and 54.6 g. (0.942 mole) of allyl alcohol. The resulting polyene was found to contain 0.53 milliequivalents of unsaturation per gram.

An adhesive composition was made using 100 parts by weight of this polyene, 5.30 parts of Polythiol A from Example II and 0.5 part of benzophenone. The composition was coated and cured as in Example IX. The 180° peel adhesion to stainless steel was found to be 1.10 lb./in. This would be considered a somewhat low value for most pressure sensitive adhesive applications.

The calculated theoretical crosslink density of this mixture is 0.210 milliequivalents of crosslink sites per gram.

EXAMPLE XI

This example shows how a further increase in crosslink density results in a product which fails to perform as a pressure senstive adhesive.

The polyene synthesis of Example IX was followed except that the amounts of reactants were 1700 g. (0.838 mole) of PPG-2025, 292 g. (1.676 mole) of toluene diisocyanate and 108 g. (1.850 mole) of allyl alcohol. The resulting polyene was found to contain 0.81 milliequivalents of unsaturation per gram.

A composition was made using 100 parts by weight of this polyene, 9.9 parts of Polythiol A from Example II and 0.5 part of benzophenone. The composition was coated and cured as in Example IX. The cured composition was solid and tack-free, and did not adhere upon pressing into contact with stainless steel or other substrates.

The calculated theoretical crosslink density of this mixture is 0.368 milliequivalents of crosslink sites per gram.

EXAMPLE XII 458 g. (0.23 moles) of a commercially available liquid polymeric diisocyanate sold under the tradename "Adiprene L-100" by E. I. Dupont de Nemours & Co. was charged to a dry resin kettle maintained under a nitrogen atmosphere and equipped with a condenser, stirrer, thermometer, and gas inlet and outlet. 37.8 g. (0.65 mole) of allyl alcohol was charged to the kettle and the reaction was continued for 17 hours with stirring at 100°C. Thereafter, the nitrogen atmosphere was removed and the kettle was evacuated 8 hours at 100°C. 50 cc. dry benzene was added to the kettle and the reaction product was azeotroped with benzene to remove the unreacted alcohol. This allyl terminated liquid prepolymer had a molecular weight of approximately 2,100.

An adhesive having the formulation by weight:

| | |
|---|---|
| Polyene of Example XII | 100 parts |
| Benzophenone | 1.2 parts |
| Polythiol A | 3.0 parts | is mixed and roller coated to a 1 mil thickness on 1 mil thick, 1 inch wide cellulose acetate backing. The coating is cured using ultraviolet radiation (4,000 microwatts/cm$^2$) to a tacky condition. The thus formed tape was then pressed into contact with a stainless steel substrate.

Following the procedure of ASTM D1000 with a peel angle of 180°, the force required to peel the tape off the substrate was 3.53 lbs./in. The polyene/polythiol composition of this example had a calculated crosslink density of 0.120 milliequivalents of crosslink sites per gram.

As aforestated, the resulting normally tacky adhesive composition comprising cured polythioether must have a theoretical crosslink density in the range 0.001–0.230 milliequivalents of crosslink sites per gram or to put it another way, the polyene/polythiol composition prior to curing must be a liquid under ambient conditions and have a potential crosslink density in the range 0.001–0.230 milliequivalents of crosslink sites per gram.

The flexible backing member to which the curable polyene/polythiol adhesive composition is applied can be any of the commonly employed flexible backings which are well known to those skilled in the art, some of which have already been mentioned herein. Additionally the adhesive composition can be coated on cellular, compressible, resiliant materials such as foam strips used for insulating purposes. The adhesive can be on one or both sides of the foam. Such foams include polyvinyl chloride, polyurethane, rubber foams and polystyrene foams.

When using UV radiation, suitably in the wavelength of 2,200–4,000 angstroms, to perform a curing; the photocuring reaction rate can be increased by the use of a photocuring rate accelerator or photosensitizer.

Various photosensitizers are operable and well known to those skilled in the art. Examples of photosensitizers include, but are not limited to, benzophenone, acetophenone, acenapthene-quinone, methyl ethyl ketone, valerophenone, hexanophenone, γ-phenylbutyrophenone, p-morpholinopropiophenone, dibenzosuberone, 4-morpholinobenzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, 1 naphthaldehyde, 4,4'-bis(dimethylamino) benzophenone, fluorene-9-one, 1'-acetonaphthone, 2'-acetonaphthone and 2,3-butanedione, etc. which serve to give greatly reduced exposure times and thereby when used in conjunction with various forms of energetic radiation yield very rapid, commercially practical time cycles by the practice of the instant invention. The photosensitizers, i.e., curing rate accelerators or photoinitiators are usually added in an amount ranging from 0.0005 to 20% by weight, preferably 0.1 to 2% based on the weight of the polyene and polythiol.

What is claimed is:

1. A pressure-sensitive, normally tacky adhesive comprising a substantially completely crosslinked or cured polythioether consisting essentially of the reaction product of a liquid polyene containing at least two unsaturated carbon to carbon bonds per molecule and a liquid polythiol containing at least two thiol groups per molecule and the total combined functionality of the unsaturated carbon to carbon bonds per molecule in the polyene and the thiol groups per molecule in the polythiol is greater than four, said polyene and said polythiol being of such molecular weight that upon complete crosslinking the polythioether has a theoretical crosslink density in the range 0.001–0.230 milliequivalents of crosslink sites per gram.

2. A pressure sensitive adhesive tape comprising a flexible support having thereon a layer of the adhesive of claim 1.

3. A method for producing a pressure sensitive adhesive tape which comprises coating a support on at least one side thereof with a composition comprising a liquid polyene containing at least two unsaturated carbon to carbon bonds per molecule and a liquid polythiol containing at least two thiol groups per molecule, the combined functionality of the carbon to carbon unsaturation in the polyene and the thiol groups in the polythiol being greater than four and curing said composition to form a substantially completely crosslinked or cured tacky, adhesive polythioether polymer, said polyene and said polythiol being of such molecular weight that upon complete crosslinking the polythioether has a theoretical crosslink density in the range 0.001 to 0.230 milliequivalents of crosslink sites per gram.

4. The method according to claim 3 wherein the curing is performed by UV irradiation in the presence of a photoinitiator.

5. The method according to claim 3 wherein the curing is performed by beta radiation.

* * * * *